United States Patent
Gudim et al.

(10) Patent No.: US 9,739,878 B2
(45) Date of Patent: Aug. 22, 2017

(54) METHODS AND APPARATUS FOR DETERMINING ANGLE OF ARRIVAL (AOA) IN A RADAR WARNING RECEIVER

(71) Applicant: RAYTHEON COMPANY, Waltham, MA (US)

(72) Inventors: Eric J. Gudim, Goleta, CA (US); William H. Wellman, Santa Barbara, CA (US)

(73) Assignee: RAYTHEON COMPANY, Waltham, MA (US)

( * ) Notice: Subject to any disclaimer, the term of this patent is extended or adjusted under 35 U.S.C. 154(b) by 762 days.

(21) Appl. No.: 14/224,667

(22) Filed: Mar. 25, 2014

(65) Prior Publication Data

US 2016/0363660 A1    Dec. 15, 2016

(51) Int. Cl.
| | |
|---|---|
| G01S 13/44 | (2006.01) |
| G01S 3/26 | (2006.01) |
| G01S 3/36 | (2006.01) |
| G01S 5/02 | (2010.01) |
| G01S 5/04 | (2006.01) |
| G01S 5/12 | (2006.01) |
| G01S 7/02 | (2006.01) |
| G01S 13/66 | (2006.01) |

(52) U.S. Cl.
CPC ............ *G01S 13/4472* (2013.01); *G01S 3/26* (2013.01); *G01S 3/36* (2013.01); *G01S 5/02* (2013.01); *G01S 5/04* (2013.01); *G01S 5/12* (2013.01); *G01S 7/021* (2013.01); *G01S 13/66* (2013.01)

(58) Field of Classification Search
CPC ........ G01S 13/4472; G01S 13/66; G01S 3/36; G01S 3/26; G01S 5/12; G01S 5/02; G01S 5/04; G01S 7/021

USPC ..... 342/20, 95–97, 133, 139, 140, 146, 147, 342/417
See application file for complete search history.

(56) References Cited

U.S. PATENT DOCUMENTS

| | | | |
|---|---|---|---|
| 2,551,696 A | 5/1951 | Ogurkowski | |
| 4,700,191 A | * 10/1987 | Manor | ................ G01S 7/021 340/502 |
| 4,734,702 A | 3/1988 | Kaplan | |
| 5,017,929 A | 5/1991 | Tsuda | |

(Continued)

FOREIGN PATENT DOCUMENTS

| | | | | |
|---|---|---|---|---|
| CA | 2933558 A1 | * 10/2015 | ............... | G01S 3/26 |
| DE | 3411832 A1 | * 10/1985 | ............. | G01S 7/021 |
| GB | 2 439 987 A | 1/2008 | | |

OTHER PUBLICATIONS

EPO Communication Pursuant to Rules 161(1) and 162 EPC for EP Application No. 15742131.4-1812 dated Nov. 4, 2016; 2 Pages.

(Continued)

*Primary Examiner* — John B Sotomayor
(74) *Attorney, Agent, or Firm* — Daly, Crowley, Mofford & Durkee, LLP

(57) ABSTRACT

Methods and apparatus for determining an angle of arrival in a radar warning system that uses tracking to provide a more accurate angle of arrival than conventional systems. In exemplary embodiments, angle of arrival and range are mapped from measured body angles to a 3D coordinate system where modern tracking techniques are applied to improve accuracy and stabilization of measurements, then mapped back into body angles for display.

17 Claims, 11 Drawing Sheets

(56) References Cited

U.S. PATENT DOCUMENTS

| | | | |
|---|---|---|---|
| 5,063,385 A * | 11/1991 | Caschera | G01S 7/021 |
| | | | 342/13 |
| 5,075,694 A | 12/1991 | Donnangelo et al. | |
| 5,241,313 A | 8/1993 | Shaw et al. | |
| 5,378,155 A * | 1/1995 | Eldridge | F41G 3/26 |
| | | | 340/988 |
| 5,477,230 A | 12/1995 | Tsui | |
| 5,526,001 A * | 6/1996 | Rose | G01S 1/026 |
| | | | 342/442 |
| 5,774,087 A * | 6/1998 | Rose | G01S 7/021 |
| | | | 342/113 |
| 6,759,893 B2 | 7/2004 | Gailhard et al. | |
| 6,784,840 B2 | 8/2004 | Menegozzi et al. | |
| 7,539,273 B2 | 5/2009 | Struckman | |
| 7,764,217 B2 | 7/2010 | Yannone | |
| 7,782,256 B2 | 8/2010 | Smith | |
| 2014/0139374 A1 * | 5/2014 | Wellman | G01C 21/165 |
| | | | 342/450 |
| 2014/0281779 A1 * | 9/2014 | Wellman | G06F 11/0706 |
| | | | 714/746 |

OTHER PUBLICATIONS

PCT International Search Report and Written Opinion of the ISA dated Oct. 28, 2015; for PCT Pat. App. No. PCT/US2015/011570; 10 pages.

PCT International Preliminary Report on Patentability dated Sep. 27, 2016 corresponding to US Application No. PCT/US2015/011570; 8 pages.

Response to EPO Communication filed May 3, 2017 for European Application No. 15742131.4, 20 pages.

Response to EPO Communication dated Nov. 4, 2016 for European Application No. 15742131.4; Response filed on May 5, 2017; 20 Pages.

* cited by examiner

| FIG. 6A | FIG. 6B |

METHODS AND APPARATUS FOR DETERMINING ANGLE OF ARRIVAL (AOA) IN A RADAR WARNING RECEIVER

STATEMENT REGARDING FEDERALLY SPONSORED RESEARCH

The present invention was made with Government support under contract N68936-12-D-0018 awarded by U.S. Navy. The Government has certain rights in the invention.

BACKGROUND

As is known in the art and shown in the prior art system of FIG. 1, an airborne radar warning receiver (RWR) system on an aircraft 102, for example, indicates the direction of a radar 101 that illuminates the aircraft, alerting the crew to possible danger. For full circle protection, four antennas desirably are aimed (or boresighted) at an even angle spacing of 90 degrees. Emitter direction is determined by comparing signals from two antennas 103a,c with the strongest signals, which vary with antenna off-boresight angle in a known manner.

As the direction of arrival increases away from the antenna boresight direction, antenna gain decreases in a predictable manner. The signal strengths depend on antenna gain alone, since both antennas are essentially equidistant from the emitter, and receive energy at the same emitter beam angle. However, this ideal uniformity at times is not met, since RWR antenna gain is disturbed by reflections and shadowing from the aircraft that can cause significant errors.

SUMMARY

The present invention provides method and apparatus for increasing the accuracy and steadiness of angle-of-arrival information for pilot display and data bus situation awareness communications using coordinate transformation sequences and multidimensional least-squares tracking technology, for example. The coordinate transformations establish common coordinates for emitter location and aircraft attitude and location, while tracking technology intelligently updates measurements to reduce noise and increase accuracy.

In one aspect of the invention, a method comprises: receiving signals from an emitter on a plurality of antennas of a radar warning receiver system; determining an angle of arrival of the received signals from the emitter from first and second ones of the plurality of antennas; determining a range for the emitter from a strength of the signals from the first and second ones of the plurality of antennas; receiving navigational information for a vehicle to which the radar warning receiving is attached; combining, using a computer processor, the aircraft attitude information with the range and the angle of arrival to determine a position of the emitter in three dimensions; using navigation data to stabilize the three-dimensional emitter position against aircraft position changes; applying tracking to the successive three-dimensional emitter location estimates to generate at least one track of position for the emitter; and using the at least one track when information from the radar warning receiver is not available.

The method can further include one or more of the following features: using Kalman tracking, using Least Squares Optimum tracking, using Simplex tracking, selectively using a range value corresponding to an emitter distance no greater than a preset limit, nor greater than a horizon distance determined by aircraft altitude, using a tracker to process a moving emitter in three position coordinates and at least one velocity coordinate, using angle of elevation data to limit tracking updates to a preset limit, tracking in three Cartesian coordinates that correspond to the coordinate axes of the aircraft navigation system, and/or estimating an altitude of the emitter to determine the three-dimensional tracking.

In another aspect of the invention, an article comprises: a non-transitory storage medium containing stored instructions that enable a machine to: receive signals from an emitter on a plurality of antennas of a radar warning receiver system; determine an angle of arrival of the received signals from the emitter from first and second ones of the plurality of antennas; determine a range for the emitter from a strength of the signals from the first and second ones of the plurality of antennas; receive navigational information for a vehicle to which the radar warning receiving is attached; combine the aircraft attitude information with the range and the angle of arrival to determine a position of the emitter in three dimensions; use navigation data to stabilize the three-dimensional emitter position against aircraft position changes; apply tracking to the successive three-dimensional emitter location estimates to generate at least one track of position for the emitter; and use the at least one track when information from the radar warning receiver is not available.

The article can further include one or more of the following features: instructions for using Kalman tracking, instructions for selectively using a range value corresponding to an emitter distance no greater than a preset limit, nor greater than a horizon distance determined by aircraft altitude, instructions for using a tracker to process a moving emitter in three position coordinates and at least one velocity coordinate, instructions for using angle of elevation data to limit tracking updates to a preset limit, instructions for tracking in three Cartesian coordinates that correspond to the coordinate axes of the aircraft navigation system, and/or instructions for estimating an altitude of the emitter to determine the three-dimensional tracking.

In a further aspect of the invention, a system comprises: a plurality of antennas of a radar warning receiver system to receive signals from an emitter; a radar warning system including a memory and a processor configured to: determine an angle of arrival of the received signals from the emitter from first and second ones of the plurality of antennas; determine a range for the emitter from a strength of the signals from the first and second ones of the plurality of antennas; receive navigational information for a vehicle to which the radar warning receiving is attached; combine the aircraft attitude information with the range and the angle of arrival to determine a position of the emitter in three dimensions; use navigation data to stabilize the three-dimensional emitter position against aircraft position changes; apply tracking to the successive three-dimensional emitter location estimates to generate at least one track of position for the emitter; and use the at least one track when information from the radar warning receiver is not available.

BRIEF DESCRIPTION OF THE DRAWINGS

The foregoing features of this invention, as well as the invention itself, may be more fully understood from the following description of the drawings in which.

DETAILED DESCRIPTION

Figure 1:
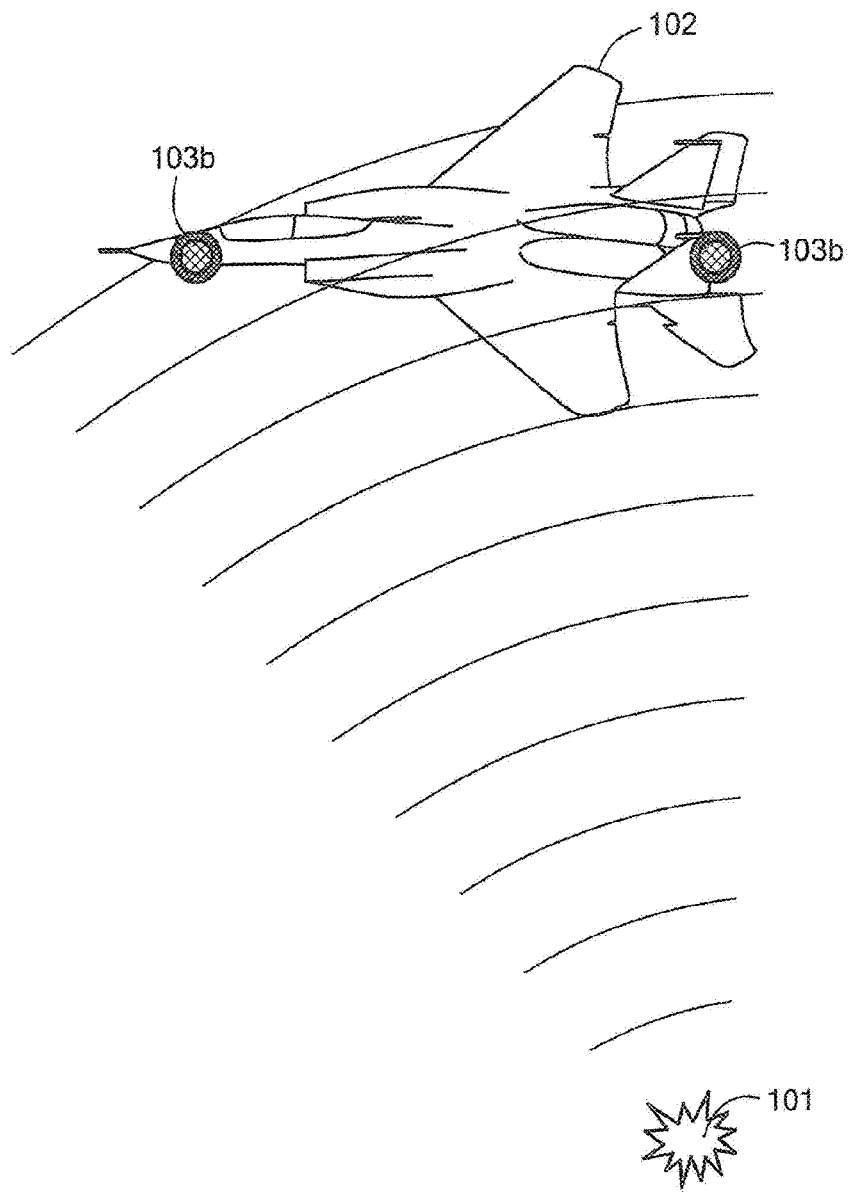
FIG. 1 is a prior art schematic depiction of a passive radar warning system detecting signals from a remote emitter by two of its antennas for the determination of angle of arrival (AOA)
Figure 2:
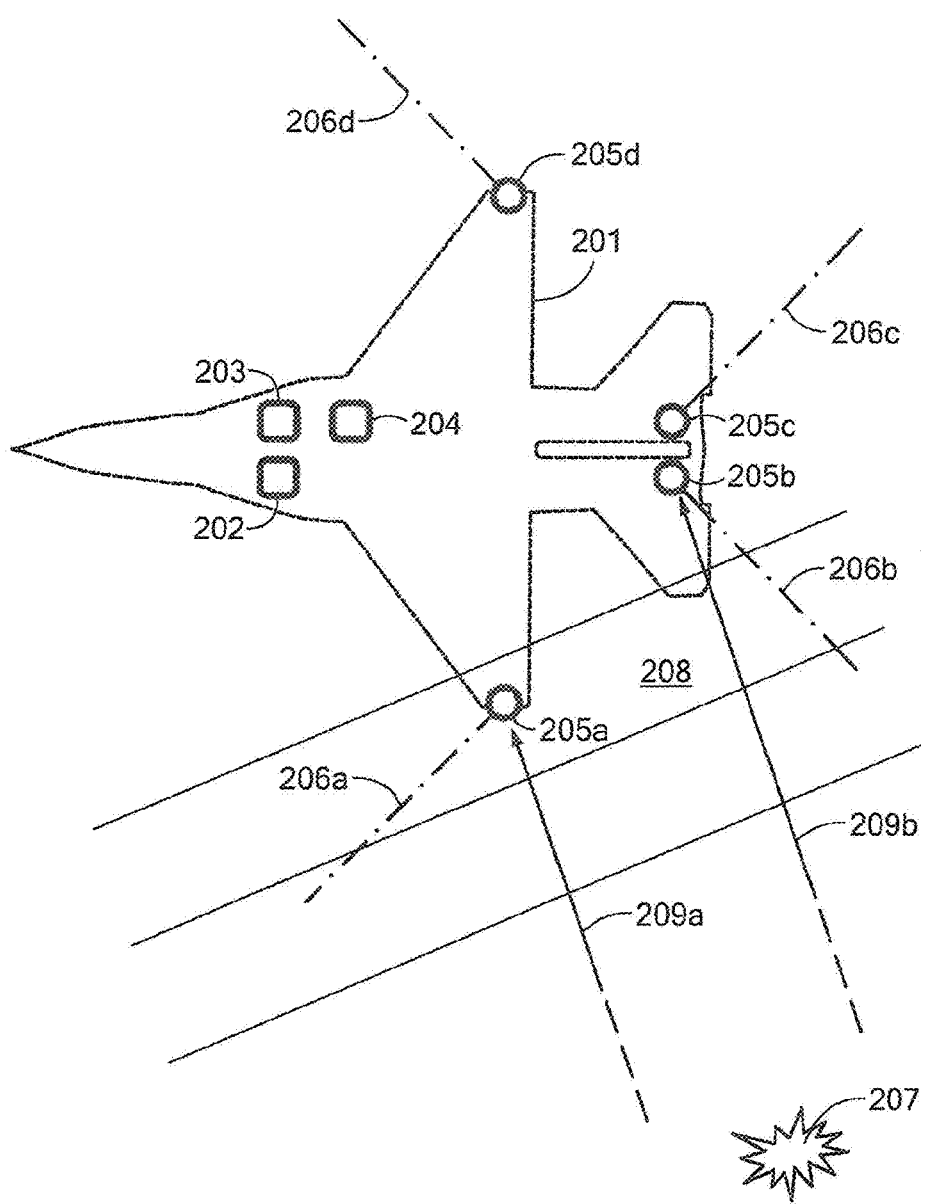
FIG. 2 is a schematic representation of an exemplary radar warning system that uses track information in accordance with exemplary embodiments of the invention.

FIG. 2 shows an exemplary radar warning receiver system installed in an aircraft platform. It is understood that similar configurations may be used on other platforms. Aircraft (201) is equipped with inertial navigation system (202), and radar warning receiver components of processor (203), display (204), and four antennas (205a,b,c,d) that are aimed or boresighted in four different directions (206a,b,c,d). Alternative embodiments may use a greater or lesser number of antennas, and orient the boresight in different directions.

In the illustrated embodiment, the strongest signals from distant emitter (207) are detected by the two antennas (205a,b) whose boresight (206a,b) most nearly face emitter (207), which generally are the two antennas with strongest received signal. The emitter transmission propagates along wavefront (208), and reaches antennas (205a,b) at a direction indicated by rays (209a,b). Because the distance to the emitter is large, each antenna is effectively equidistant from the emitter, hence receives the same RF signal; consequently, the antenna output signal strength varies only due to variations in antenna gain, which varies with off-boresight angle: the difference between boresights (206) and ray angles (209). This detection process is the standard "monopulse difference technique" for measuring AOA. Processor (203) uses the antenna signals to identify individual emitters by their waveform characteristics, and to calculate AOA and other emitter parameters. In accordance with exemplary embodiments of the invention, the processor (203) combines the signals from antennas with signals from INS (202), to yield a more accurate indication of AOA on display (204), as explained below.

Figure 3:
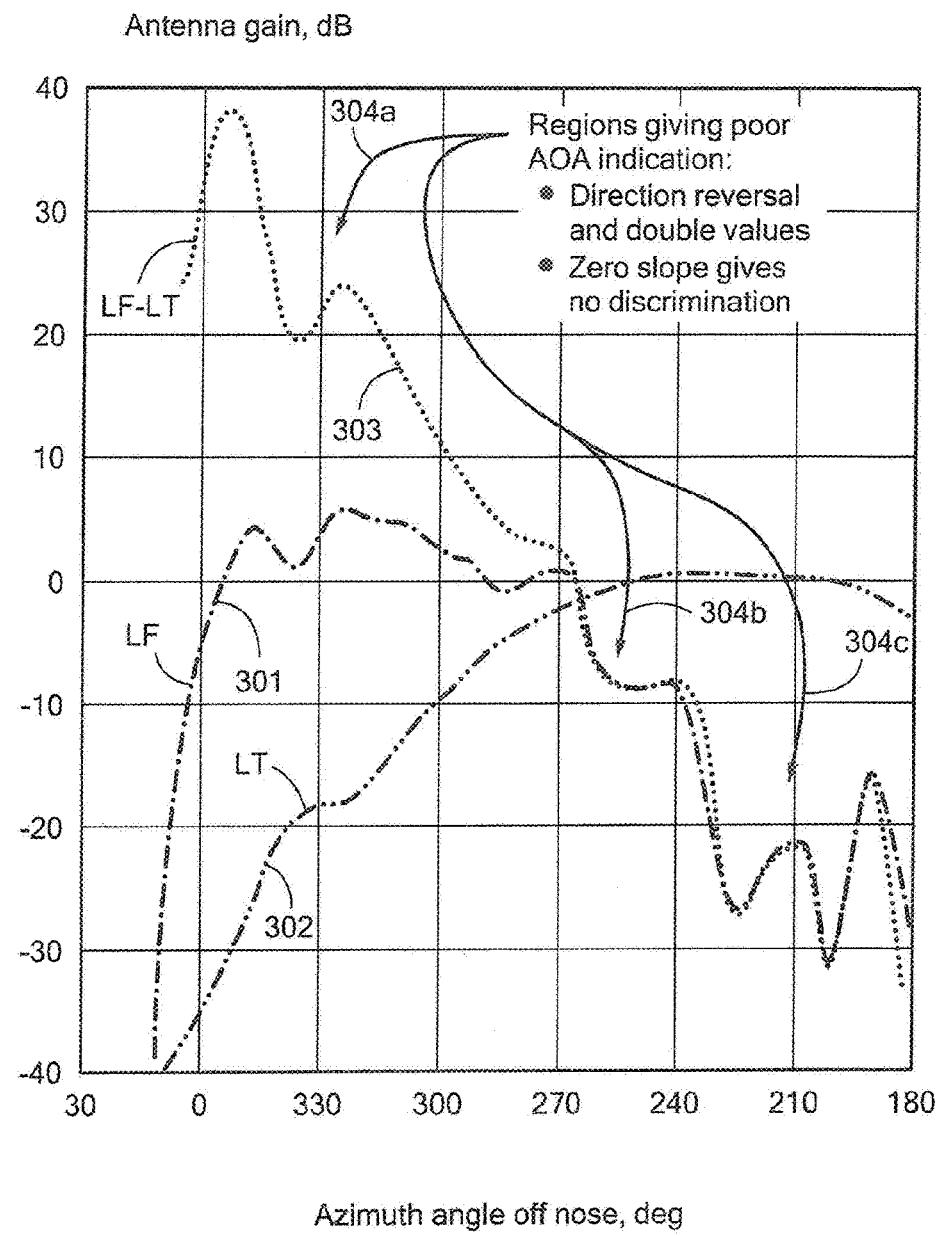
FIG. 3 is a graphical representation of typical antenna gains for paired antennas of a radar warning system.

FIG. 3 shows the AOA indications resulting from the monopulse difference technique, as a plot of gain versus off-nose azimuth angle in degrees for two antennas (205a,b) of FIG. 2. In this example, the angle span covers the entire left or port side of the aircraft. Curve (301) shows signal strength as measured by left front antenna of (205a) FIG. 2, while curve (302) shows the signal from left rear antenna (205b) of FIG. 2. As noted above, relative signal strengths from an antenna pair indicate AOA where strength decreases with angle away from antenna boresight. Curve (303) shows the difference between these two antenna signals. The ideal difference signal would be proportional to angle, thereby directly and unambiguously indicating AOA, but such ideal linearity is upset by antenna pattern irregularities (304a,b,c). Antenna gain irregularities typically arise from the wider field of view of RWR antennas, and the often non-optimum placement of antennas on the aircraft. At some angles, the aircraft body can obscure the line-of-sight. At other angles, reflections off the aircraft surface can interfere with the direct signals from the emitter, giving erratic gain fluctuations known as multipath effects.

Figure 4:
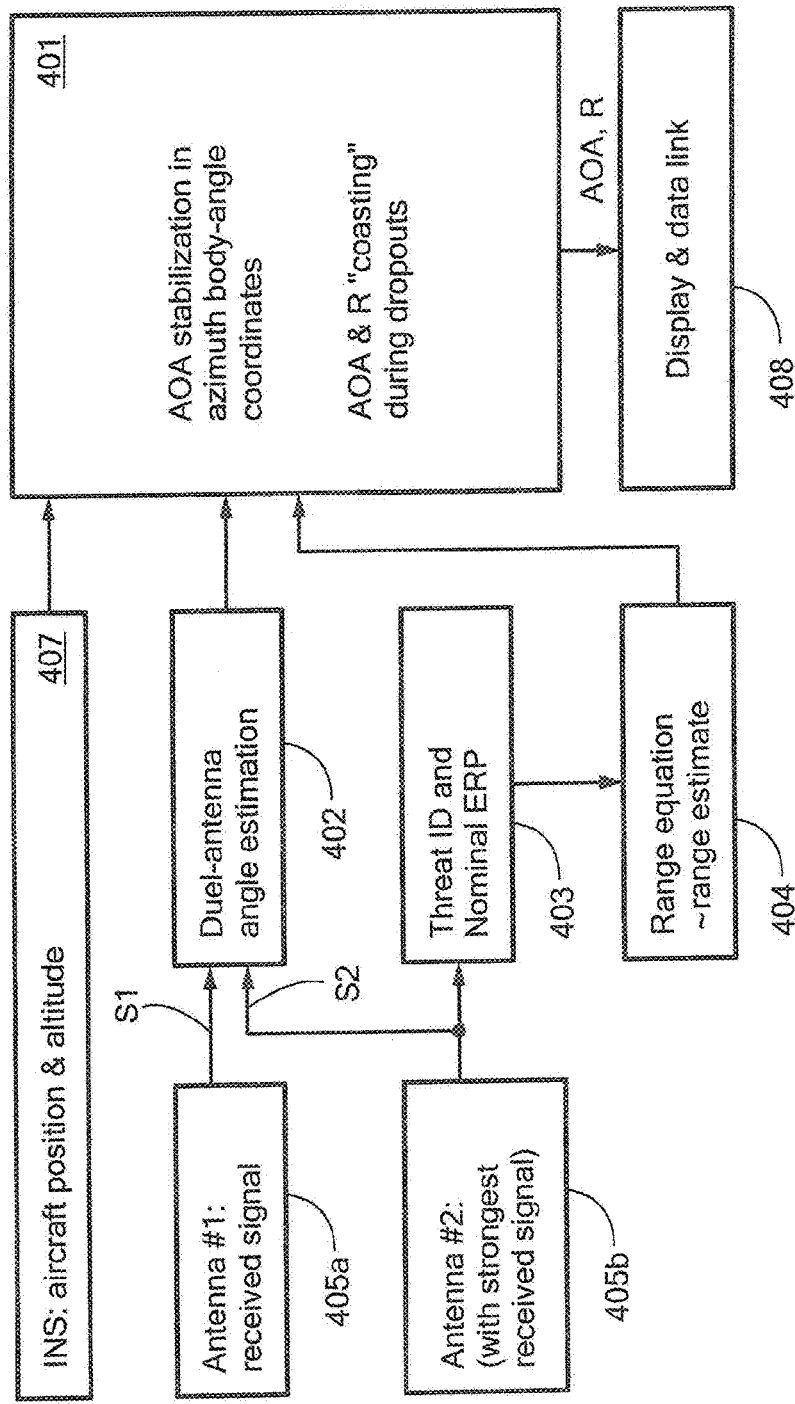
FIG. 4 is a functional block diagram of a prior art radar warning system including AOA calculation and display.

FIG. 4 shows typical prior-art signal processing (401), which uses monopulse angle estimates (402), together with threat data (403) and range estimates (404) and, to yield AOA and range for cockpit display to the pilot and communication via data link (408). By convention, AOA is shown in a north-east plane, parallel to the earth surface. The primary measurements are signal strength sensed by an antenna pair (405a,b), and aircraft position and attitude sensed by inertial navigation system (407).

First and second signals S1, S2, which usually are chosen as having the strongest of at least four antenna signals, are matched to a single emitter. Conventional RWR monopulse calculations use the ratio of first and second signals S1, S2 to estimate angle of arrival 402 of the signals from the emitter. RWR identification determines the threat and obtains its nominal effective radiated power (ERP) 403 from the RWR threat data base in a manner well known in the art. The stronger signal is combined with ERP to estimate range 404, using the standard range equation.

The basic RWR emitter identification function (403) determines the threat type, and obtains its nominal effective radiated power (ERP), using a built-in threat data base. Range estimation (404) is based on the standard range equation, applied to the stronger of the signals S1, S2 from the two antennas (405a,b).

Stabilization processing within the signal processing (401) typically includes the functions of time-averaging and "smoothing" that reduces noise and erratic errors in AOA. It also includes tracking, in that rate information from the aircraft navigation system (407) supplements AOA measurements, and enables predictive AOA changes that correct for the effects of aircraft maneuver when signals become too weak for AOA calculations. Often called "tracking," this feature more accurately would be called "coasting". Typically range and AOA data are maintained in those coordinates throughout the smoothing process. The smoothed AOA and range values are directly used by the existing Display and Data Link (408).

A shortcoming of this conventional approach is that stabilization is performed in the two-dimensional plane of the display, and in aircraft body-angle coordinates. This stabilization essentially is open-loop, in the sense that aircraft turning rates are simply added to prior AOA angles to carry the indicated AOA through periods where the signal is unavailable. An average of prior AOA values may be averaged to reduce noise, giving the appearance of stability, simple averaging does not refine AOA or range accuracy; at best, it just reduces erratic errors. This process also assumes sightline angles to the threat are in the horizontal plane, which is not the case for emitters at close range, or when the aircraft roll angle is not near zero, resulting in significant inaccuracies.

Figures 5, 6:
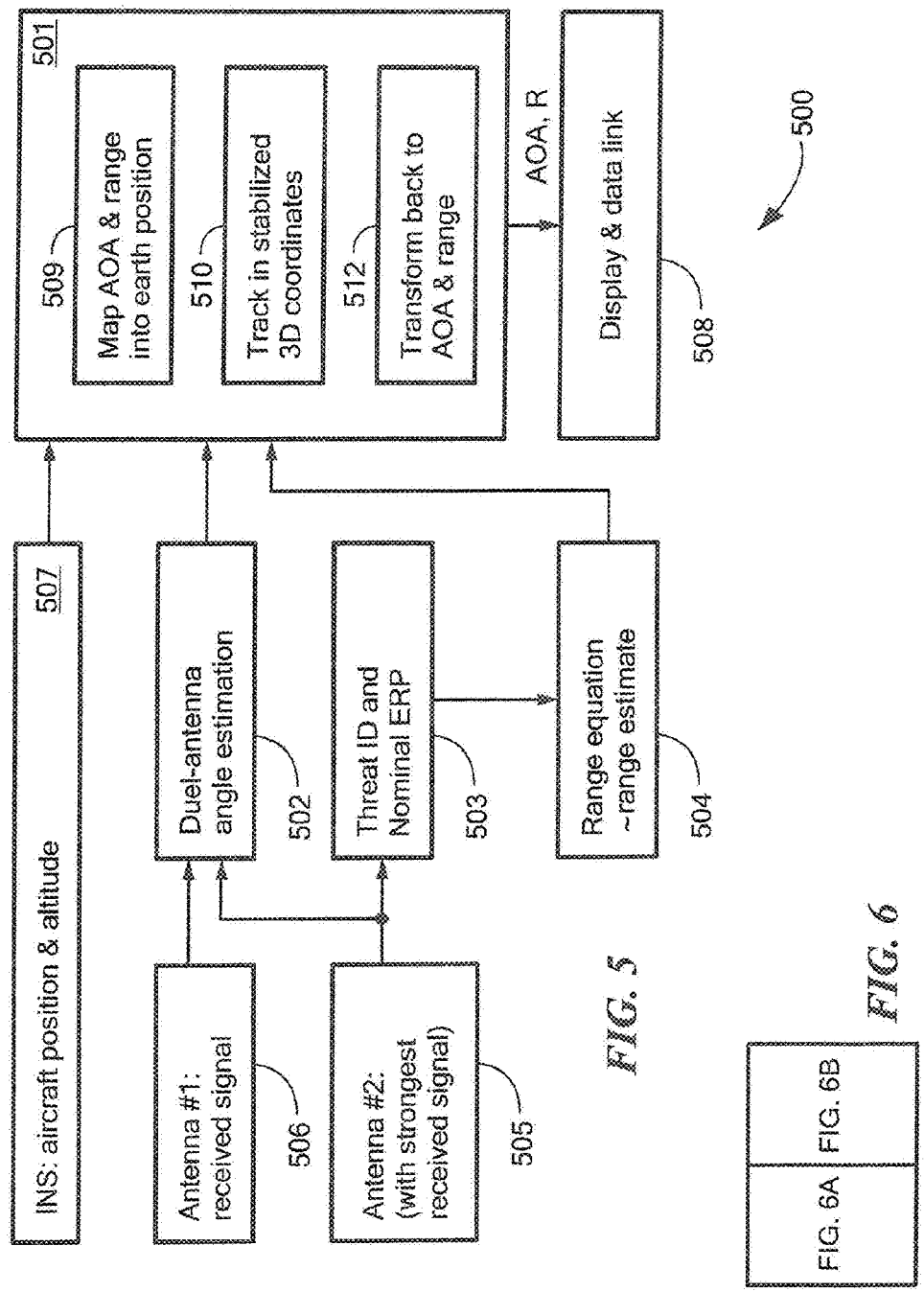
FIG. 5 is a functional block diagram of an exemplary radar warning system using track information in accordance with exemplary embodiments of the invention including AOA calculation and display.
FIG. 6 is a representation of AOA processing in accordance with exemplary embodiments of the invention.
Figure 6A:
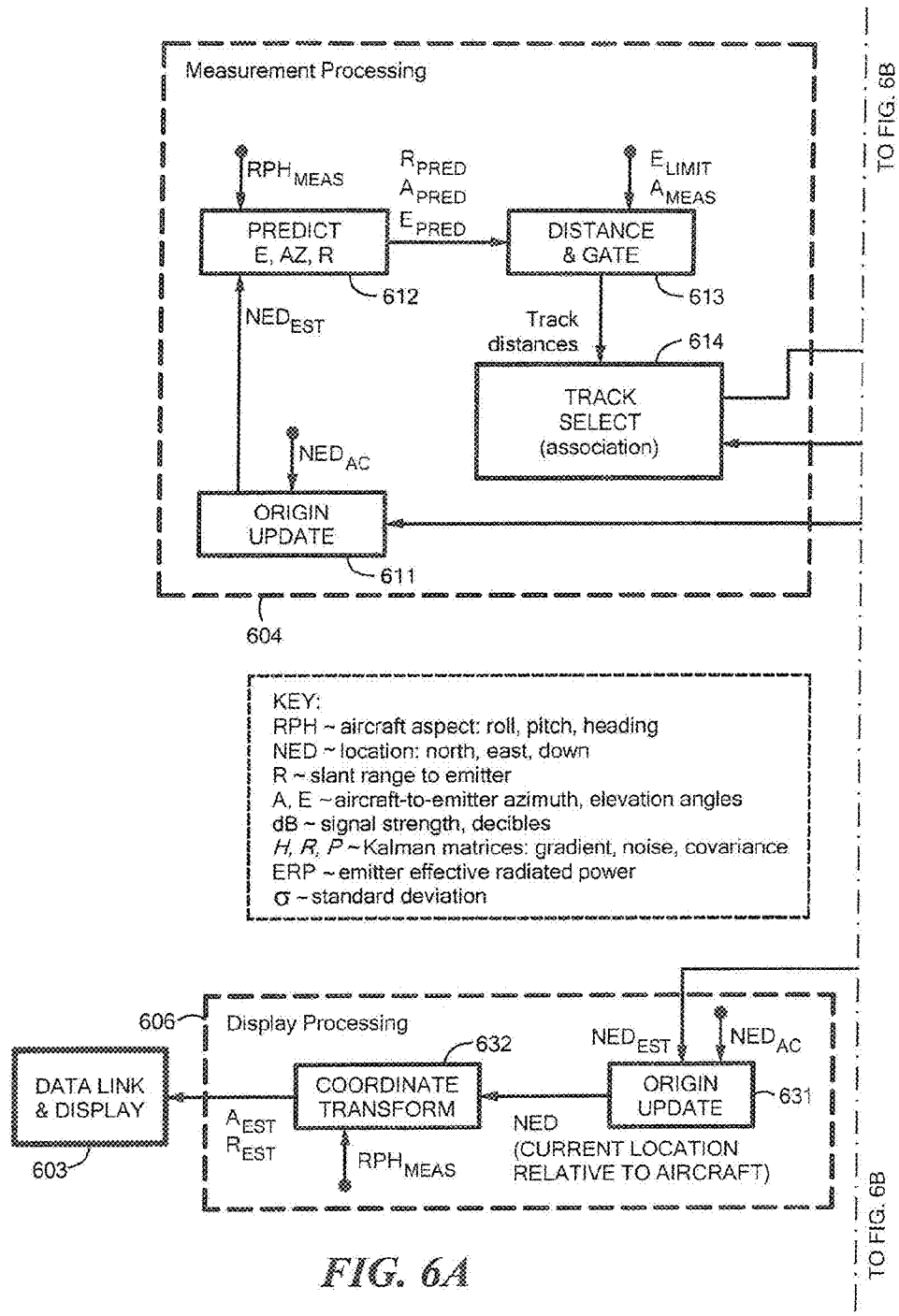
Figure 6B:
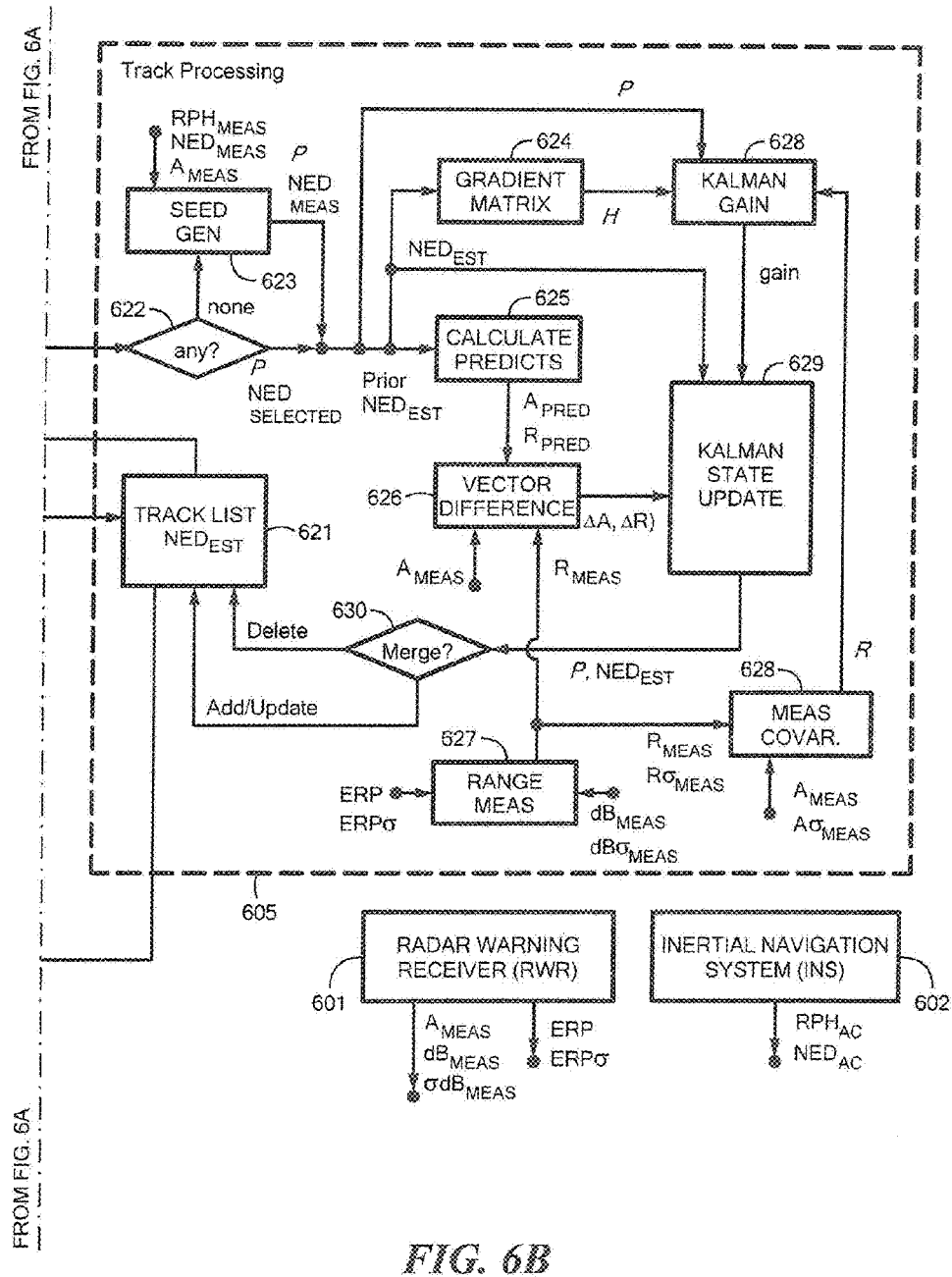

FIG. 5 shows an exemplary radar warning receiver system (500) having enhanced angle-of-arrival accuracy in accordance with exemplary embodiments of the invention. Processing module (501) receives data inputs: monopulse angle estimates (502), together with threat data (503) and range estimates (504), and yields AOA and range for cockpit display to the pilot and communication via data link (508). Primary measurements include: signal strength sensed by two antennas (505, 506), and aircraft position and attitude sensed by inertial navigation system (507).

In one embodiment, stabilization processing (501) combines polar coordinates of angle (502) and range (503) with aircraft position and attitude from the aircraft inertial navigation system (507), and an assumed emitter altitude, to yield a three-dimensional location (509). At any one data point, the measured AOA and range values generally are highly inaccurate, but because these points now are in stable inertial coordinates, tracking (510) can be applied to improve accuracy with successive measurements, as described more fully below. Moreover, when there are gaps between measurements, this location can be held at its prior location by making appropriate corrections for known aircraft motion. Using the aircraft position and attitude, geometric calculations then yield angle of arrival (AOA) and range (512), for output to the display module (508) to render the cockpit AOA display to the pilot far more stable than measurements stabilized conventionally in angle alone.

AOA processing module (501) combines angle of arrival information, range, and aircraft information from the inertial navigation system, for example, and maps emitter position into three dimensional space, where it can be inertially stabilized against aircraft aspect and emitter distance changes. This mapping enables stable tracking of emitter location relative to the aircraft. The Kalman filter is one suitable tracker embodiment, but Simplex, LMA, or other tracking methods may be used instead in which the coordinate conversion and tracking process converts a sequence of inaccurate measurements into an accurate three dimensional emitter location. To display the angle of arrival information, emitter location is converted back for angle of arrival display for a pilot, for example.

This use of Kalman or similar tracking techniques improves the accuracy of the measured data, by making a noise-weighted least-mean-square error fit to the sequence of measured data that has been transformed into three-dimensional space suitable for tracking and inertial stabilization. Note that the Kalman technique is well-known for three-dimensional tracking of target position. However, using a Kalman technique for stabilization of a one-dimensional AOA display is inventive as tracking location is not reported, but used clandestinely for stabilization in an intermediate three-dimensional space, and transformed back into AOA for display and reporting. This use of three-dimensional (3D) tracking with relatively inaccurate two-dimensional data establishes a stabilized 3D track point that makes the AOA for threat warning display significantly more accurate than conventional AOA processing. The inventive sequence of mapping, stabilization, and inverse mapping enables long-term stabilization. In addition, eliminating gross display errors increases pilot confidence in the radar warning system and makes it more useful.

It is understood that exemplary embodiments of a radar warning system are useful for any vehicle or structure in which it is desirable to determine a location of a radar emitter. Exemplary radar warning system carriers include ships, helicopters, drones, and other moving platforms. Platform motion increases accuracy by providing measurements at different emitter angles, so tracking can average out the localized anomalies of individual measurements, such as shown in FIG. 3.

FIG. 6 shows an exemplary RWR system having AOA determination that includes tracking information to enhance AOA accuracy by establishing and maintaining a current track file of 3D emitter locations, shown here in aircraft-centered north-east-down (NED) coordinates. The illustrative embodiment is well-suited for stationary ground-based emitters. Stabilized with aircraft inertial navigation system (INS) rate and orientation data, the NED coordinates make continuous use of past measurements, so track data progressively becomes more accurate than the RWR source data. The tracking data also maintains accuracy when 'good' RWR data is not available, unlike conventional RWR systems. For example, data is gated out at high elevation angles where antenna patterns introduce large measurement errors, while 3D tracking continues to hold the best available position estimate.

Interconnecting lines show data flow between system elements. To avoid complicated crossing of lines and to emphasize data flow, some connections are indicated as points labeled with the specific data concerned, but still with arrows indicating the source and use of data.

RWR (601) yields data by means of RWR functions of emitter identification, measurement association, and track file formation. Each separate measurement is summarized in an Emitter Data Word (EDW) that includes measured angle of arrival or azimuth angle ($A_{MEAS}$), measured signal level ($dB_{MEAS}$), measured noise or signal level fluctuation ($\sigma dB_{MEAS}$), and emitter effective radiated power (ERP). The expected variation or inaccuracy ERPσ in the radiated power figure is added to the EDW in the illustrated embodiment; however, exemplary embodiments of the invention alternatively may use a simple fixed value, or a value calculated by an appropriate algorithm based on known phenomenology.

Inertial Navigation System (602) yields aircraft location in north-east-down coordinates, and aircraft aspect in roll-pitch-heading coordinates. This function also could be performed by virtually any other equipment that provides this attitude and location information, including remote sensing and tracker-based equipment.

Display & Data Link (603) indicates AOA to the pilot on a standard display. It also communicates AOA and range to the aircraft data bus, using existing RWR data bus interfaces. Aboard tactical aircraft, this data link conventionally interfaces with a Mission Data Computer, which may distribute data over data links to other participants in the aircraft mission.

Measurement processing (604) is performed for each measurement, and for each track when multiple emitters have been detected, which typically is the case. Track processing (605) performs tracking of each emitter, being updated for each measurement to yield a current estimate of emitter location. Display processing (606) creates threat coordinates for display and data sharing. These display updates may be synchronized with the data measurements, or may be set at other times consistent with the tracking status or display need.

Measurement processing (604) begins with an update of NED origin (611), which adjusts each previously estimated emitter location $NED_{EST}$ to account for aircraft position change from prior and current position $NED_{AC}$, as determined by INS (602). This is done for all emitter locations in Track List (621), and maintains the NED origin at the current aircraft location. Note that this choice of coordinates simplifies calculation of azimuth angle and range, but is only one of several possible choices. For example, emitters could be tracked in true earth location of latitude, longitude, and altitude above mean sea level. Whatever the coordinate reference, what will be used in later calculations will be the three-dimensional difference of aircraft and emitter positions.

Further steps in Measurement Processing (604) are performed for each of the emitter locations in Track List (621). Predict (612) calculates emitter coordinates $R_{PRED}$, $A_{PRED}$, and $E_{PRED}$ from emitter locations $NED_{EST}$ and aircraft attitude $RPH_{MEAS}$ from INS (602). Next, distance calculations (613) screen AOA measurements ($A_{MEAS}$) from RWR (601), and pass only those that fall within preset limits of elevation angle ($E_{LIMIT}$). Although not shown in this embodiment, other parameters could be used in addition to elevation angle, such as range or signal strength. For measurements that pass this screening, distance calculations (613) determine the difference between predicted azimuth and estimated azimuth angles $AZ_{MEAS}$ for every emitter in Track List (621). In other embodiments, distance may combine this difference in azimuth angle with a difference in other measured parameters, such as signal strength or range. Also, waveform characteristics could be further scrutinized, beyond what RWR (602) naturally performs for essential emitter identification and track association functions.

Given track distance, Track Select module (614) finds the tracked emitter that is closest to the current measurement, and also within preset gate limits. Distance may be determined by a simple one-dimensional distance in azimuth, which has proven adequate with flight-test data. However, a two-dimensional azimuth and range distance may be used, if range measurement accuracy is adequate. Alternatively, more involved association criteria could be used, even including multi-hypothesis tracking, which holds multiple track possibilities along with their respective probabilities of matching the current measurement. In the embodiment of FIG. 6, one track at the most is selected and passed forward for track processing.

While the screening and gate limits are shown here as fixed and preset parameters, it is recognized that they could adapted to scenario parameters such as antenna pair, emitter type, polarization, signal strength, azimuth angle, or other parameters that influence AOA measurement accuracy.

Track Processing (605) first determines (622) if Track List (621) is empty, or did not contain any track within the preset gate limits, in which case Seed Gen (623) generates a NED location from $RPH_{MEAS}$ from INS (602), combined with $NED_{MEAS}$ (601) and $A_{MEAS}$ from RWR (601). This simple first-value calculation has proven adequate with flight data, but it is recognized that other means of initiating a track could be used instead, including but not limited to averaging several prior angle and range measurements, or averaging their associated NED calculation results. Similarly, Seed Gen (623) calculates covariance matrix P from a preset function of azimuth angle, which has proven effective. It is understood that more complicated equations involving other measured parameters from the INS or RWR could be used for calculating covariance matrix P. If Track List (621) is determined (622) to have a track that meets Select Track (614) requirements, its data are used for covariance matrix P and prior $NED_{EST}$.

Gradient Matrix (624) develops error gradient matrix H, which express the incremental change in NED coordinates due to an incremental change in AE coordinates; this is a straightforward geometric mapping established by current emitter location $NED_{EST}$, with that are essentially the partial derivatives of the coordinate transformation at the given NED location. Kalman Gain (628) is developed from gradient matrix H, adjusted or weighted by measurement covariance matrix P, which is determined by Measurement Covariance (628) from $A_{MEAS}$, $R_{MEAS}$, and their anticipated inaccuracies $A\sigma_{MEAS}$ and $E\sigma_{MEAS}$.

Vector difference (626) calculates the difference between predicted and measured values of azimuth and elevation angles A and E, which is a typical error input to Kalman Tracker (629). Calculate Predicts (625) develops $A_{PRED}$ and $R_{PRED}$ from $NED_{EST}$ in a simple coordinate transformation. RWR (601) provides $A_{MEAS}$. Range Measurement (627) provides $R_{MEAS}$, based on measured signal strength $dB_{MEAS}$ and effective radiated power ERP, which are supplied by RWR (601).

Kalman Tracker (629) updates the prior $NED_{EST}$, based on gain-weighted gradient matrix H, resulting in an improved $NED_{EST}$, and updated covariance matrix P. Technology of the Kalman tracker is well-known as applied to the tracking of moving targets, and as applied to the smoothing of noisy signals. Its robust technology is used here in an inventive system architecture that improves accuracy of angle determination by means of coordinate conversion to three-dimensional space, full inertial stabilization in that space, and conversion back to angle space for display, as noted earlier. It is understood that in contrast to conventional systems, tracking is done in coordinates well-suited to stabilization and error minimization.

At times the measured range data is poor due to the emitter being detected away from the main lobe of its beam pattern, giving rise to unrealistically long ranges, even over the horizon. For such cases, Range Measurement (627) uses a preset range value, typically approximating half the distance to the horizon. Other factors than one-half could be used, as a matter of routine engineering optimization. The limiting of range is vital to calculations based on signal strength, since radar effective power varies widely in practical situations. Signals from a scanning radar may not be captured at the instant the antennas are fully within the mainlobe of maximum illumination, and signals from any radar may be diminished by radar maintenance condition or by deliberate programming.

Display Processing (606) operates independently from Measurement and Track Processing (604 & 605). At selected intervals, $NED_{EST}$ values are read from Track List (621). Origin Update (631) corrects the NED origin to the current aircraft location, using $NED_{AC}$ from Inertial Navigation System (602). Coordinate Transform (632) converts these NED coordinates to the azimuth and range coordinates desired for pilot display and data link transmission. The timing of these outputs may be set asynchronously in accord with usage criteria, rather than synchronized with the measurement and track processing cycle.

For display updates, the 3D track data are transformed into the desired AOA and Range coordinates. This typically operates at a fixed rate, and seamlessly coasts through signal loss or corruption, unlike the typical real-time RWR processing. At each display update, the current best information is provided from the stabilized track list. The timing of such updates is independent of the measurements, and typically occurs at a lower rate, as noted earlier.

The exemplary embodiment described above establishes 3D position of a stationary emitter, using a three-state Kalman filter that accommodates aircraft maneuvers and edits poor data when elevation angle exceeds its useful range. Alternatively, LMS (Least Mean Square) processing can be used. Weighted LMS optimization and other techniques can also be used.

It should be noted that the above description assumes use of a preset value for emitter height above mean sea level, combined with aircraft altitude from the inertial navigation system, to determine the down component of the north-east-down coordinate system. Ground-based emitters may be assumed to be at the altitude of the earth beneath the aircraft, which also is known by aircraft instrumentation. However, accuracy of altitude is less important than the fact that tracking is established in a stable coordinate system. Similarly, accuracy of range data is less important than its use as an added dimension that better guides coordinate transformation into 3D space, as discussed below.

In other embodiments, higher order tracking can be used for airborne emitters, where emitter velocity is a variable. In one embodiment, a five-state Kalman filter was successfully simulated with real flight data. One embodiment combines north and east velocities to the north-east-down position in a 5-state tracker providing stabilized AOA and range against airborne emitters; this variation has been proven successful with real flight data in a post-flight simulation. In other embodiments, a 6-state or other tracker may be useful.

As noted above, the implementation of FIG. 6 is useful for ground-based emitters. The same or similar configuration is useful for slowly moving emitters, such as shipboard transmitters. It stabilizes tracking even when the aircraft with the RWR maneuvers strongly. It also measures elevation angle so measurements made at angles beyond the antenna useful range can be blocked from degrading accuracy, triggering a stabilized "coast" wherein the tracking position is simply held and updated for aircraft motion only.

Another advantage is provided by use of a Kalman covariance matrix to slow divergence from a good solution when a sequence of inaccurate measurements occur. As an example, tracking typically establishes a position that is more correct in angle than in range, which is reflected in the 3D covariance matrix achieving good confidence in angle, thereby enabling the tracker to respond to changes in angle, but respond only slowly to changes in range, which diminishes erratic updates to the typically inaccurate range measurement. Conversely, when data quality is poor, the tracker also resists changes in angle; this holds the emitter location and consequent AOA in place, rather than walking off when sequences of non-zero-mean angle errors occur.

While a Kalman implementation has the advantage of producing immediate solutions at each update, batch or other least-mean-square processing could be used. Weighting of errors is desirable, but could be omitted without eliminating the fundamental advantage of stable 3D tracking to improve a 1D indicator.

Figure 7:
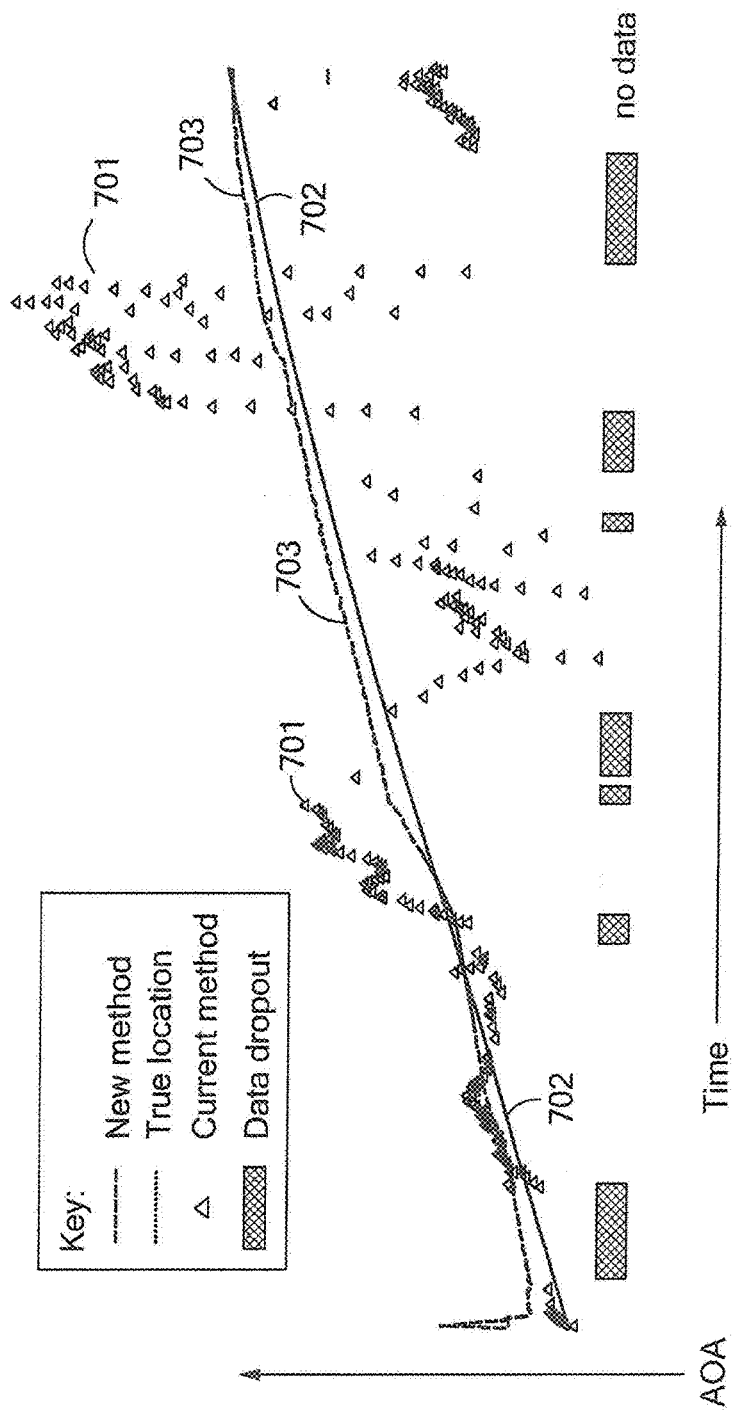
FIG. 7 is a graphical representation of AOA versus time showing the accuracy improvements for an exemplary embodiment of the invention compared with a conventional system.

FIG. 7 shows an exemplary plot showing AOA calculated from actual recorded flight data for an angular region where coverage by two antennas is problematic. This happens at some AOA angles, since RWRs typically are designed with only four antennas in order to meet their primary alert function with minimum complexity. While it is understood that additional RWR antennas would improve warning and emitter-location capability, this often is not practical.

Triangle markers 701 show the data from conventional methods and times at which data was available. Gaps with no data are highlighted with grey bars. A first curve 702 shows the true AOA determined by post-flight analyses using range data for true emitter and aircraft location, and recorded inertial navigation system data for true aircraft angular orientation. A second curve 703 shows the AOA calculated in accordance with exemplary embodiments of the invention, and using the same RWR measurements.

As can be seen, the second curve 703 closely follows the true AOA angle 702 and gives the pilot a relatively good and steady indication of the emitter direction. The prior art data 701 gives highly erratic responses, which seriously degrade usefulness of the AOA display.

Figure 8:
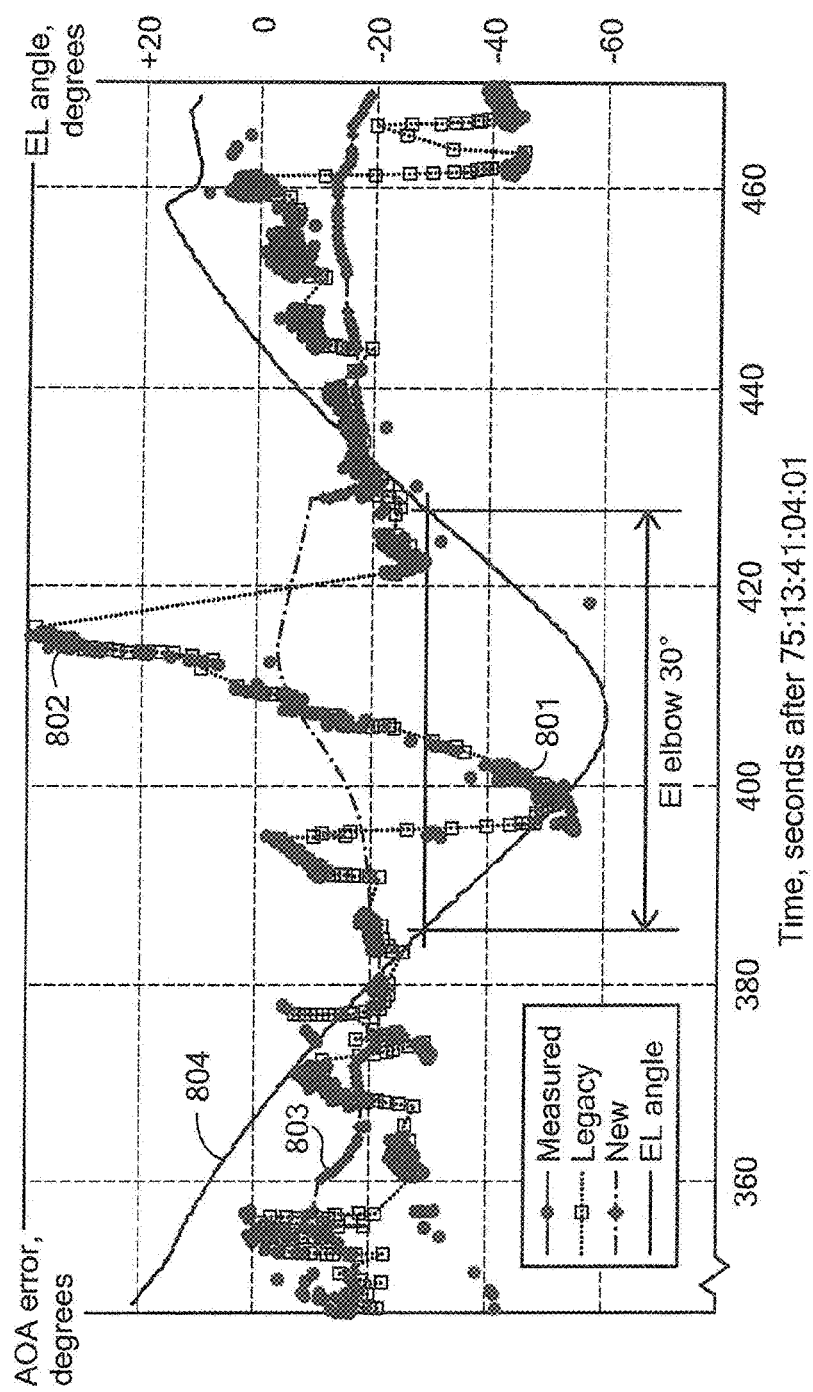
FIG. 8 is a graphical representation of AOA error versus time, showing accuracy improvements for an exemplary embodiment of the invention compared with a conventional system.

The plot of FIG. 8 shows AOA errors for the inventive and legacy processes, for a time segment of unusually poor performance. Raw data 801 is measured by the standard monopulse difference technique. A second trace 802 shows AOA errors as shown to the pilot, with squares marking the points where measurements made corrections. A third trace 803 shows AOA errors as shown to the pilot, with diamonds marking the points where measurements made corrections. A solid trace 804 shows true elevation angle, as calculated post-flight from true position of the aircraft and emitter.

As can be seen, AOA values are highly inaccurate in the central zone of this plot, both as measured, and as displayed by the legacy system. These extreme errors are eliminated by inventive processing by editing out measurements at steep elevation angles, e.g., above a given threshold, such as below thirty degrees.

Figure 9:
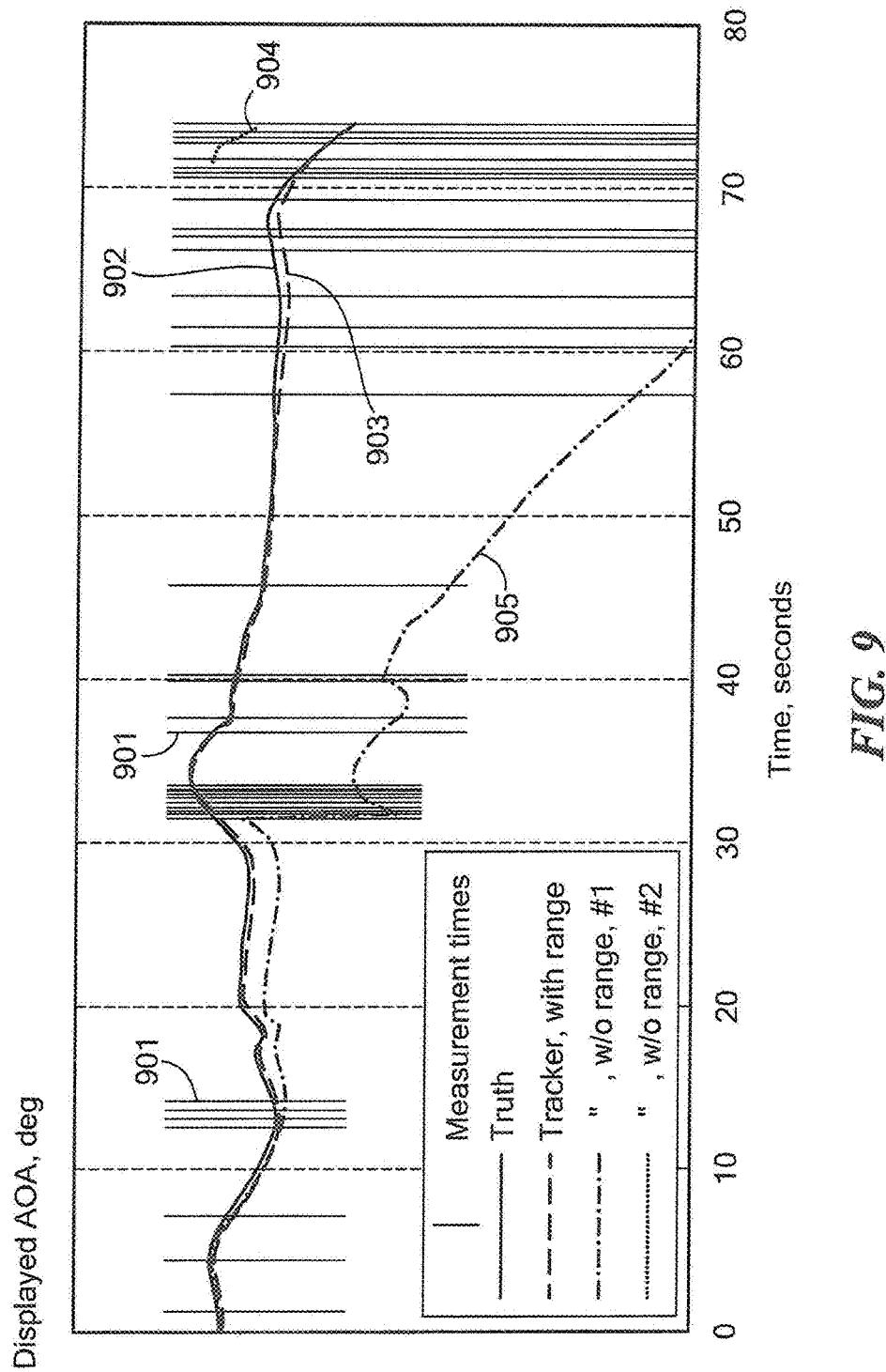
FIG. 9 is a graphical representation of displayed AOA versus time illustrating typical accuracy improvements when the emitter is tracked in range as well as in angle.

FIG. 9 shows a plot of displayed AOA over time using range data. One aspect of the invention relates to the use of range, as well as azimuth, measurements to provide stable 3D tracking. The range coordinate nominally is orthogonal to AOA, although its effect on AOA calculation is more subtle than mere coordinate mapping into a 3D position. Even though the range measurement is inherently inaccurate and noisy, it does help overcome angle bias, which otherwise would give large errors over longer tracking intervals.

Range is determined by received signal strength, which decreases with distance to the emitter by the well-known radar range equation. As described above, RWR identifies emitter by type, and has reference data for emitter effective radiated power. The range measurement is orthogonal to the angle measurement and provides information for 3D tracking. For example, for tracking in north-east-down coordinates (NED) centered at the aircraft, the north and east components are readily determined from measured angle and range, when combined with a down estimate initially based on aircraft altitude. As shown and described above, implemented in a Kalman tracker, gradient calculations efficiently use NED errors to update NED tracking position with each measurement. As described above, NED position is transformed into azimuth, elevation and range coordinates for pilot display.

FIG. 9 shows the use of range as well as azimuth measurements to provide more accurate azimuth angle (AOA) measurement with and without range measurement, for a case where measured data is sparse—that is for a situation that requires long intervals of "coasting" in the absence of measurements. Vertical lines (901) mark the times at which measurements are available. Solid curve (902) is true azimuth angle, while dashed curve (903) is the stabilized azimuth angle. Curves (904 and 905) are the stabilized results without use of range data. Curve 905 is the track initially established, which diverges strongly even during a period of frequent measurements, and continues to diverge subsequently as measurements become infrequent. Eventually the error becomes so large that observations track fall outside the track association limits, and tracking ceases. Somewhat later curve (904) shows tracking resuming when measurements are more abundant. By comparison, curve (903) retains good accuracy over the entire observation interval. This figure is used to illustrate rather than rigorously explore an effect that experience has shown valid over a wide span of data.

In exemplary embodiments of the invention, 3D tracking is performed with only AOA measurements, using the additional dimensionality of typical aspect and position changes of aircraft maneuvers. This improves AOA accuracy even when range data is unavailable or highly inaccurate. This happens, for example, when tracking emitters do not operate at full signal strength, when scanning emitters are not sensed at a time when the emitter beam illuminates the RWR at an off-boresight angle where radiated power is less, and when multipath interference reduces illumination at the RWR.

One aspect of the invention includes 3D tracking, which uses range data to advantage when it is available, but also operates with only angle data when range data is poor or unavailable. The plots show the results of substituting the half-horizon distance when the emitter appears at a range more distant than the radar horizon. The horizon distance is readily calculated from RWR altitude. It is understood that any practical horizon distance adjustment can be made to meet the requirements of a particular application.

In addition to this half-horizon substitution, minimum range processing is used, in which the shortest of several sequential range measurements is used, rather than any individual measurement. This "rolling minimum" improves accuracy over any one measurement or even of the "rolling average" of several measurements. This inventive process mitigates the impact of signal fluctuations with scanning radar illuminators, as well as signal fluctuations due to multipath reflections.

Figure 10:
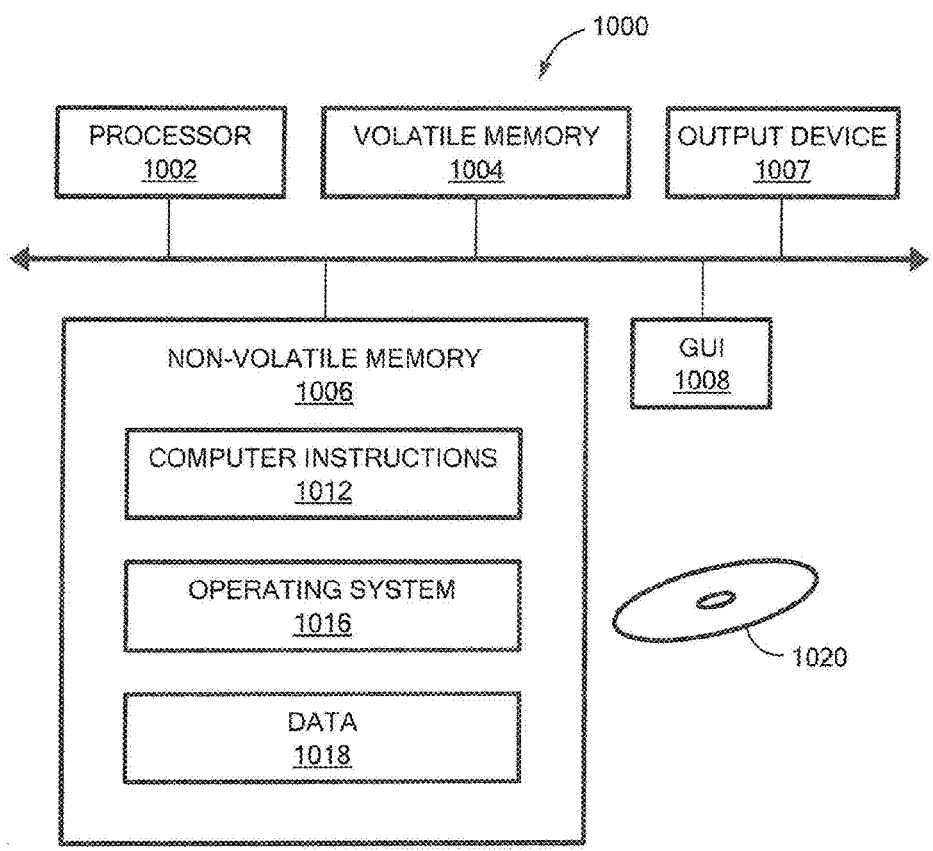
FIG. 10 is an exemplary computer that performs at least a portion of the processing described herein.

FIG. 10 shows an exemplary computer 1000 that can perform at least part of the processing described herein. The computer 1000 includes a processor 1002, a volatile memory 1004, a non-volatile memory 1006 (e.g., hard disk), an output device 1007 and a graphical user interface (GUI) 1008 (e.g., a mouse, a keyboard, a display, for example). The non-volatile memory 1006 stores computer instructions 1012, an operating system 1016 and data 1018. In one example, the computer instructions 1012 are executed by the processor 1002 out of volatile memory 1004. In one embodiment, an article 1020 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
receiving signals from an emitter on a plurality of antennas of a radar warning receiver system;
determining an angle of arrival of the received signals from the emitter from first and second ones of the plurality of antennas;
determining a range for the emitter from a strength of the signals from the first and second ones of the plurality of antennas;
receiving navigational information for a vehicle to which the radar warning receiver is attached, the navigational information including aircraft attitude information;
combining, using a computer processor, the aircraft attitude information with the range and the angle of arrival to determine a position of the emitter in three dimensions;
using navigation data to stabilize the three-dimensional emitter position against aircraft position changes;
applying tracking to the successive three-dimensional emitter location estimates to generate at least one track of position for the emitter;
using the at least one track when information from the radar warning receiver is not available; and
transforming the at least one track into angle of arrival data.

2. The method according to claim 1, further including using Kalman tracking.

3. The method according to claim 1, further including using Least Squares Optimum tracking.

4. The method according to claim 1, further including using Simplex tracking.

5. The method according to claim 1, further including selectively using a range value corresponding to an emitter distance no greater than a preset limit, nor greater than a horizon distance determined by aircraft altitude.

6. The method according to claim 1, further including using a tracker to process a moving emitter in three position coordinates and at least one velocity coordinate.

7. The method according to claim 1, further including using angle of elevation data to limit tracking updates to a preset limit.

8. The method according to claim 1, further including tracking in three Cartesian coordinates that correspond to the coordinate axes of the aircraft navigation system.

9. The method according to claim 1, further including estimating an altitude of the emitter to determine the three-dimensional tracking.

10. An article, comprising:
a non-transitory storage medium containing stored instructions that enable a machine to:
receive signals from an emitter on a plurality of antennas of a radar warning receiver system;
determine an angle of arrival of the received signals from the emitter from first and second ones of the plurality of antennas;
determine a range for the emitter from a strength of the signals from the first and second ones of the plurality of antennas;
receive navigational information for a vehicle to which the radar warning receiver is attached, the navigational information including aircraft attitude information;
combine the aircraft attitude information with the range and the angle of arrival to determine a position of the emitter in three dimensions;
use navigation data to stabilize the three-dimensional emitter position against aircraft position changes;
apply tracking to the successive three-dimensional emitter location estimates to generate at least one track of position for the emitter;
use the at least one track when information from the radar warning receiver is not available; and
transforming the at least one track into angle of arrival data.

11. The article according to claim 10, further including instructions for using Kalman tracking.

12. The article according to claim 10, further including instructions for selectively using a range value corresponding to an emitter distance no greater than a preset limit, nor greater than a horizon distance determined by aircraft altitude.

13. The article according to claim 10, further including instructions for using a tracker to process a moving emitter in three position coordinates and at least one velocity coordinate.

14. The article according to claim 10, further including instructions for using angle of elevation data to limit tracking updates to a preset limit.

15. The article according to claim 10, further including instructions for tracking in three Cartesian coordinates that correspond to the coordinate axes of the aircraft navigation system.

16. The article according to claim 10, further including instructions for estimating an altitude of the emitter to determine the three-dimensional tracking.

17. A system, comprising:
a plurality of antennas of a radar warning receiver system to receive signals from an emitter;
a radar warning system including a memory and a processor configured to:
determine an angle of arrival of the received signals from the emitter from first and second ones of the plurality of antennas;
determine a range for the emitter from a strength of the signals from the first and second ones of the plurality of antennas;
receive navigational information for a vehicle to which the radar warning receiver is attached, the navigational information including aircraft attitude information;
combine the aircraft attitude information with the range and the angle of arrival to determine a position of the emitter in three dimensions;
use navigation data to stabilize the three-dimensional emitter position against aircraft position changes;
apply tracking to the successive three-dimensional emitter location estimates to generate at least one track of position for the emitter;
use the at least one track when information from the radar warning receiver is not available; and
transforming the at least one track into angle of arrival data.

* * * * *